(12) United States Patent
Mayer et al.

(10) Patent No.: US 11,550,312 B2
(45) Date of Patent: Jan. 10, 2023

(54) METHOD FOR ANALYZING MALFUNCTIONS IN A SYSTEM OF PROCESS AUTOMATION

(71) Applicant: Endress+Hauser Process Solutions AG, Reinach (CH)

(72) Inventors: Michael Mayer, Oberwil (CH); Jan Pflug, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 496 days.

(21) Appl. No.: 16/348,963

(22) PCT Filed: Oct. 10, 2017

(86) PCT No.: PCT/EP2017/075803
§ 371 (c)(1),
(2) Date: May 10, 2019

(87) PCT Pub. No.: WO2018/086812
PCT Pub. Date: May 17, 2018

(65) Prior Publication Data
US 2019/0271977 A1    Sep. 5, 2019

(30) Foreign Application Priority Data
Nov. 11, 2016  (DE) .................. 10 2016 121 623.2

(51) Int. Cl.
*G05B 23/02*      (2006.01)
(52) U.S. Cl.
CPC ..... *G05B 23/0272* (2013.01); *G05B 23/0264* (2013.01); *Y02P 90/02* (2015.11)
(58) Field of Classification Search
CPC .................. G05B 23/0272; G05B 23/0264
See application file for complete search history.

(56) References Cited

U.S. PATENT DOCUMENTS

| | | | |
|---|---|---|---|
| 2004/0148130 A1* | 7/2004 | Scott | G05B 23/027 702/183 |
| 2005/0011278 A1* | 1/2005 | Brown | G01N 29/036 73/861.18 |

(Continued)

FOREIGN PATENT DOCUMENTS

| | | |
|---|---|---|
| DE | 10217107 A1 | 11/2002 |
| DE | 102004003605 A1 | 11/2004 |
| DE | 102016108197 A1 | 11/2016 |

OTHER PUBLICATIONS

Jason P. Wright: "Alarm Management Standards and Best Practices", Nov. 15, 2011 (Nov. 15, 2011), XP055441614, DOI: 10.1007/s10346-016-0731-5.

(Continued)

*Primary Examiner* — Eman A Alkafawi
(74) *Attorney, Agent, or Firm* — Mark A. Logan; Endress+Hauser (USA) Holding, Inc.

(57) ABSTRACT

The invention comprises a method for analyzing malfunctions and/or changes of device statuses in a system of automation technology, wherein the system has a plurality of field devices communicating with one another directly via a communication network and being designed to issue an appropriate diagnostic notice depending on a malfunction or a change of a device status in the system. The diagnostic notices are transmitted to a data bank and stored in same. The method comprises: reading the diagnostic notices from the data bank; filtering the read diagnostic notices using at least one selection criterion; linking the filtered diagnostic notices using time stamps; defining time intervals; grouping the diagnostic notices linked using the time stamps into the defined time intervals which correspond to their respective time stamps; and evaluating the grouped diagnostic notices with regard to defined abnormalities.

6 Claims, 2 Drawing Sheets

(56) References Cited

U.S. PATENT DOCUMENTS

| | | | |
|---|---|---|---|
| 2005/0012608 A1* | 1/2005 | Havekost | G05B 23/0272 340/517 |
| 2006/0156967 A1 | 7/2006 | You et al. | |
| 2010/0141421 A1 | 6/2010 | Lagnelov et al. | |
| 2018/0112795 A1* | 4/2018 | Anderson | G05B 23/0237 |
| 2018/0125689 A1* | 5/2018 | Perez | A61N 1/36014 |
| 2018/0224369 A1* | 8/2018 | Maresca | G01N 29/07 |
| 2018/0284758 A1* | 10/2018 | Cella | H04L 1/0041 |

OTHER PUBLICATIONS

Search Report for German Patent Application No. 10 2016 121 623.2, German Patent Office, dated Aug. 1, 2017, 9 pp.
International Search Report for Patent Application No. PCT/EP2017/075803, WIPO, dated Jan. 24, 2018, 14 pp.
Wright, Jason P., Alarm Management Standards and Best Practices, PlantPAx Process Automation System, Rockwell Automation, Inc., Nov. 14-15, 2011, 51 pp.
Alarm Management Standards—Are You Taking Them Seriously?, Honeywell, Advanced Solutions, 16 pp.

\* cited by examiner

METHOD FOR ANALYZING MALFUNCTIONS IN A SYSTEM OF PROCESS AUTOMATION

CROSS-REFERENCE TO RELATED APPLICATIONS

The present application is related to and claims the priority benefit of German Patent Application No. 10 2016 121 623.2, filed on Nov. 11, 2016 and International Patent Application No. PCT/EP2017/075803 filed on Oct. 10, 2017, the entire contents of which are incorporated herein by reference.

TECHNICAL FIELD

The invention relates to a method for analyzing malfunctions and/or changes in device statuses in a system of automation technology.

BACKGROUND

Field devices that are used in industrial facilities are already known from the prior art. Field devices are often used in process automation, as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial plants, field devices are usually connected to higher-level units via communications networks such as fieldbuses (Profi-bus®, Foundation® Fieldbus, HART®, etc.). Usually, the higher level units are control systems or control units, such as an SPC (stored program control) or a PLC (programmable logic controller). The higher level units are used, among other things, for process control, process visualization, and process monitoring, as well as commissioning of the field devices. The values recorded by field devices—in particular, by sensors— are transmitted via the respective bus system to one (or possibly multiple) higher level unit(s). In addition, data transmission from the higher-level unit via the bus system to the field devices is also required, in particular for configuration and parameterization of field devices and for controlling actuators.

For operating the field devices, suitable operating programs (operating tools) are necessary which either run independently on the higher level units (Endress+Hauser FieldCare, Pactware, AMS Fisher-Rosemount, PDM Siemens) or else are integrated into control system applications (Siemens PCS7, ABB Symphony, Emerson Delta V).

With communications problems in such communications networks, specialists must monitor and check said communications networks for troubleshooting over a longer period of time with special measuring tools (for example, oscilloscopes, etc.). This troubleshooting is often very time-consuming, especially since it is usually possible to examine several of these communications networks at the same time only with expensive special hardware.

In the event of malfunctions, e.g., when a limit value is exceeded, or there are changes to the device status of the field devices, e.g., caused by a restart of the field device, a diagnostic notice is output by the field device. This describes the immediate cause of the malfunction that has occurred (for example, if an upper limit value is exceeded, or there is a lack of power supply).

In a process automation system, a number of field devices are occasionally implemented, whereby an immense amount of data—also of said diagnostic notices—also occurs. This large amount of data, as well as the fact that malfunctions occur irregularly, also makes the search for the cause of the error difficult or makes it almost impossible.

SUMMARY

Starting from this problem, the aim of the invention is to propose a method which makes it easy to determine causes of errors in a process automation system.

The aim is achieved by a method for analyzing malfunctions and/or changes in device statuses in a system of automation technology, wherein the system has a plurality of field devices, wherein the field devices communicate with one another directly via a communications network, or via at least one communications unit, more particularly a gateway, a control unit, or a remote I/O, and are designed to issue an appropriate diagnostic notice depending upon a malfunction and/or a change in a device status in the system, and wherein the diagnostic notices are transmitted to a data bank and stored therein, comprising:

reading the diagnostic notices from the data bank;
    filtering the read diagnostic notices based upon at least one selection criterion;
    linking the filtered diagnostic notices using time stamps, wherein a time stamp contains a date of occurrence of a malfunction contained in the corresponding diagnostic notice;
    defining time intervals, more particularly, equal time intervals;
    grouping the diagnostic notices linked using the time stamps into the defined time intervals which correspond to their time stamps;
    evaluating the grouped diagnostic notices with regard to defined abnormalities.

The great advantage of the method according to the invention is that, in a simple and effective manner, a large amount of data from diagnostic notices of a plurality of field devices can be analyzed with regard to their cause of error. The described method is carried out, for example, by a computer of an operator.

A device status is, for example, one of the following:
    field device is on;
    field device is off;
    field device is online (successful connection to the communications network);
    field device is off-line (no connection to the communications network);
    device statuses according to NAMUR recommendation ("Okay," "Maintenance required," etc.).

Field devices that are mentioned in connection with the present invention are already described by way of example in the introductory part of the description.

An advantageous further development of the method according to the invention provides, based upon the evaluation, that a proposal be created for correcting a cause of the malfunctions and/or the changes in the device statuses. A service technician may resort for this purpose to his experience. A simple example of this: If, for example, further increased pressure values of a measuring medium are detected, the pressure can be lowered as a corrective measure. However, the more complex the abnormalities, the more experienced a person must be in order to successfully assess the appropriate corrective measure.

Alternatively, a knowledge data bank is therefore used. In the past, this data bank includes corrective options for specific abnormalities. After at least one abnormality has been determined, it is compared to the information stored in the knowledge data bank, and, in this way, one or more correction options suitable for the abnormality that occurred are proposed.

According to a first variant of the method according to the invention, it is provided that the grouped diagnostic data be evaluated using a diagram, created from the grouped diagnostic notices, in particular a heat map, in which the occurrence of the diagnostic notices per field device is represented over the specified time intervals. Included here on a first axis of the diagram are the respective field devices, the diagnostic notices of which were grouped into the corresponding groups. On the second axis of the diagram are shown the specified time intervals. If a diagnostic notice occurs within a time interval, then the intersection between the respective time interval and the corresponding field device is marked on the diagram. If the diagram is configured as a heat map, the diagnostic notices occurring for a field device within the respective time interval are also counted and represented accordingly, depending upon the calculated number (for example, using different hues).

According to a second variant of the method according to the invention, it is provided that the grouped diagnostic data be evaluated based upon a tabular listing, created from the grouped diagnostic notices, in which the occurrence of the diagnostic notices per field device is represented over the set time intervals.

According to a preferred further development of the method according to the invention, it is provided that a computer unit evaluate the diagram or the tabular listing by means of algorithms implemented on the computer unit, in particular, algorithms for image or pattern recognition and/or algorithms for cluster detection.

In an advantageous embodiment of the method according to the invention, it is provided that the diagnostic notices be generated when at least one of the following malfunctions or changes in device statuses of a field device occurs:
  a communications error of the field device;
  insufficient power supply or shutdown, or restart of the field device;
  a maintenance requirement of the field device;
  a measurement error of the field device;
  an error of at least one electronic component of the field device;
  an error of at least one software component of the field device; or
  exceeding and/or falling below defined measuring ranges.

Designated, in particular, as electronic components of the field device are its operating electronics (microprocessor, working memory, nonvolatile data memory, etc.), its measuring electronics (sensor component, evaluation electronics, etc.), and its interfaces (including electronics for conditioning the communications, (de-)coding, and/or (de-)modulation, etc.).

Software components of the field device include, in particular, its operating software (firmware) and its execution software.

According to a preferred embodiment of the method according to the invention, it is provided that the read diagnostic notices be filtered, based upon at least one of the following selection criteria:
  based upon the device type of the field devices;
  based upon the type of malfunction, or the change in the device status;
  based upon the system sector in which the respective field devices are integrated;
  based upon the respective communications unit with which the respective field devices communicate;
  based upon a respective communications structure of the field devices;
  based upon environmental influences which act on the corresponding field devices;
  based upon an operating period of the respective field devices;
  based upon the age of the field devices;
  based upon a serial number and/or a range of serial numbers;
  based upon a product batch of the field devices;
  based upon components of a supplier used for the system; or
  based upon the respective communications unit with which the respective field devices communicate.

A communications structure denotes the network protocol used, but, in particular, also the physical hardware (cabling, connection type, etc.).

The network protocol is, in particular, a fieldbus protocol of automation technology, e.g., Foundation Fieldbus, Profibus PA, Profibus DP, HART, CANbus, etc. However, the network protocol can also be a network protocol of an "Industrial Ethernet" fieldbus—for example, Profinet, HART-IP, Ethernet/IP.

Alternatively, the communications network is configured as a wireless network. The network protocol is consequently a wireless network protocol, in particular, WirelessHART, Bluetooth, Wi-Fi, ZigBee, etc.

Examples of environmental influences that can act on the field devices are, for example, moisture, gases, condensation of vapors of an aggressive process medium, lightning strike in exposed field devices, etc.

Furthermore, the read diagnostic notices can also be filtered based upon the process influences, such as pressure, flow, process medium used, temperature, etc. For example, the plurality of diagnostic notices is filtered in such a way that only diagnostic notices persist in which the temperature of the process medium in contact with the field device has been more than 100° C. Further filtering options include filtering according to the distance of the field devices to the electrical cabinet and/or filtering based upon the measurement points that are critical for the process.

According to an advantageous embodiment of the method according to the invention, it is provided that the grouped diagnostic notices be evaluated with regard to at least one of the following abnormalities:
  increasing occurrence of diagnostic notices of one or more of the field devices during one of the predetermined time intervals;

increasing occurrence of diagnostic notices with regard to a specific device type of the field devices;

increasing occurrence of diagnostic notices with regard to a respective communications structure of the field devices;

increasing occurrence of diagnostic notices with regard to a respective communications protocol of the field devices;

increasing occurrence of diagnostic notices with regard to process parameters of the field devices;

increasing occurrence of diagnostic notices with regard to a process medium with which the corresponding field devices come into contact;

increasing occurrence of diagnostic notices with regard to positions of the corresponding field devices in the system;

increasing occurrence of diagnostic notices with regard to environmental influences on the corresponding field devices;

increasing occurrence of diagnostic notices with regard to the age of the field devices;

increasing occurrence of diagnostic notices with regard to an installation height of the corresponding field devices;

increasing occurrence of diagnostic notices with regard to a type of installation of the corresponding field devices;

increasing occurrence of diagnostic notices with regard to a version number of firmware of the field devices;

increasing occurrence of diagnostic notices with regard to a version number of a communications protocol of the field devices;

increasing occurrence of diagnostic notices based upon material properties of the field devices;

increasing occurrence of diagnostic notices with regard to a power supply of the field devices; or increasing occurrence of diagnostic notices with regard to maintenance and/or exchange plans of the field devices.

The type of installation refers, in particular, to the rotation or the degree of inclination with which the field devices are attached at the application site.

The installation height refers, in particular, to the height above sea level at which the field devices are located. It may also be a height with another reference level, such as the floor of the plant, for example.

The material properties relate, for example, to the material of the field device housing. For example, a metal housing may exhibit different characteristics with respect to EMC protection than a plastic housing.

BRIEF DESCRIPTION OF THE DRAWING

The invention is explained in greater detail with reference to the following figures. Shown are.

DETAILED DESCRIPTION

Figure 1:
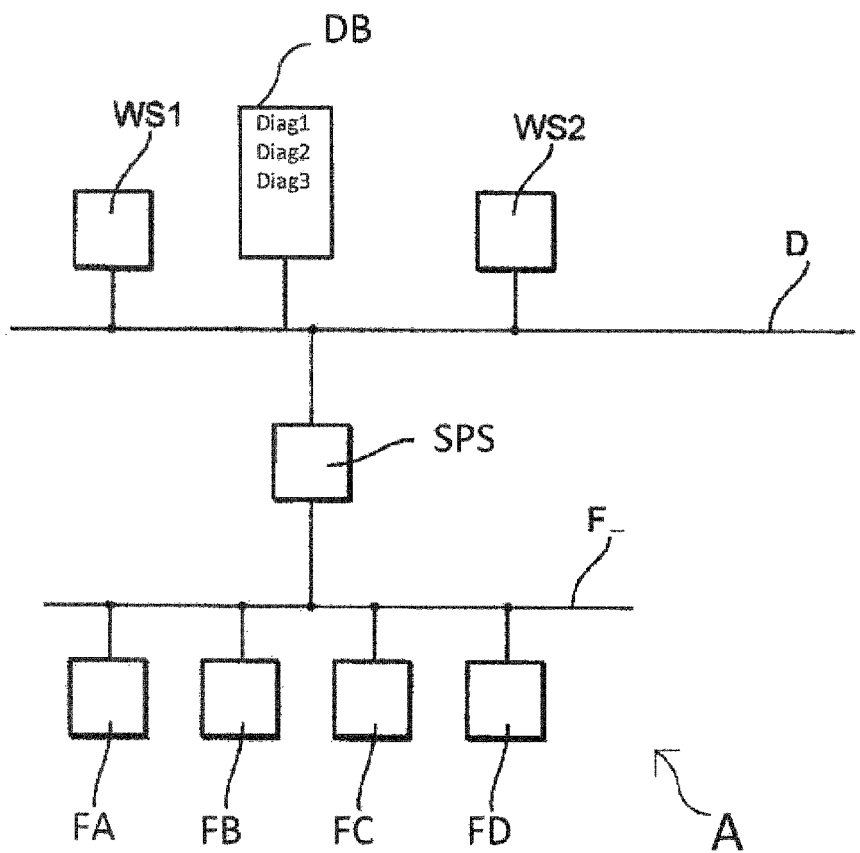
FIG. 1 shows an embodiment of the system according to the invention.

FIG. 1 shows an exemplary embodiment of the method according to the invention. A system A of automation technology is shown here. Multiple computer units WS1, WS2 in the form of workstation PC's in the control level of system A are connected to a data bus D. These computer units serve as higher level units (control system or control unit), inter alia, for process visualization, process monitoring, and for engineering, such as for operating and monitoring field devices. The data bus D operates, for example, according to the Profibus DP standard or according to the HSE (High Speed Ethernet) standard of Foundation Fieldbus. Via a communications unit PLC—in this example, a memory-programmable control unit PLC—the control plane of the system A is connected to a segment of the system A of several field devices FA, FB, FC, FD. The communications unit is connected to the field devices FA, FB, FC, FD via a fieldbus F, via which the field devices FA, FB, FC, FD are also connected to one another. The field devices FA, FB, FC, FD can be sensors as well as actuators. The fieldbus F operates according to one of the well-known fieldbus standards, such as Profibus, Foundation Fieldbus, or HART. In addition to this segment of the system A, the system A has several further segments (not depicted here), wherein the field devices FA, FB, FC, FD located in the respective segments are connected via further communications units PLC—for example, also gateways or remote I/O's with the control level of the system A.

Diagnostic notices Diag1, Diag2, Diag3 that are issued by the field devices are stored in a data bank DB, which is connected to the data bus D or is located on a workstation PC WS1, WS2 in the control level of the system A. Alternatively, the data bank DB is located in a cloud environment and can be contacted, for example, by means of the Internet.

To analyze malfunctions or changes in device statuses of the field devices FA, FB, FC, FD included in system A, or to determine their cause, the method according to the invention is applied. In the system A shown in FIG. 1, there is the problem, for example, that the communications of certain field devices FA, FB, FC, FD are disturbed again and again.

In a first method step, the diagnostic notices Diag1, Diag2, Diag3 stored in the data bank DB are extracted. They are read, for example, by means of a computing unit of the user—for example, a laptop. However, the diagnostic notices Diag1, Diag2, Diag3 can, alternatively, also be transferred to a storage medium, which is read by the computing unit of the user.

In a second method step, the diagnostic notices Diag1, Diag2, Diag3 are filtered based upon one or more selection criteria. In this embodiment, the field devices FA, FB, FC, FD are filtered based upon specific diagnostic notices Diag1, Diag2, Diag3. Specifically, these are communications breaks in the connection between the communications units PLC and the field devices FA, FB, FC, FD connected thereto. Only those diagnostic notices Diag1, Diag2, Diag3 which contain these communications breaks are used for the next method steps. The remaining diagnostic notices Diag1, Diag2, Diag3 are sorted out for the further method steps.

In a third method step, the filtered diagnostic notices Diag1, Diag2, Diag3 are provided with time stamps. These time stamps present the exact date and time at which the diagnostic notices were generated by the respective field devices FA, FB, FC, FD.

In a fourth method step, time intervals $\Delta t$ are fixed, and the diagnostic notices Diag1, Diag2, Diag3 are grouped in the defined time intervals according to their time stamps. In this example, the diagnostic notices Diag1, Diag2, Diag3 of the field devices FA, FB, FC, FD were collected over the total time period T of two years. A time interval $\Delta t$ in this case is one week.

In a final method step, the grouped diagnostic notices Diag1, Diag2, Diag3 are evaluated with regard to defined abnormalities. A heat map is depicted in FIG. 2 for this purpose.

Located on the abscissa axis of the heat map are the respective filtered field devices FA, FB, FC, FD, which communicate with the stored program control PLC shown in FIG. 1. The time intervals Δt are located on the ordinate axis. Of course, the assignment of the respective axes can also be reversed, so that the time intervals Δt are arranged on the abscissa axis, and the field devices FA, FB, FC, FD are arranged on the ordinate axis.

The times of occurrence of diagnostic notices Diag1, Diag2, Diag3, i.e., the points in time included in the time stamps at which a communications error has occurred in each case, are marked for each field device FA, FB, FC, FD within the corresponding time interval of Δt—in this case, by means of a black bar. A grid is thereby produced. If the heat map is present in a color representation, the frequency of the diagnostic notices Diag1, Diag2, Diag3 may be mapped within a specific time interval by variation in the color of the bars. The closer the time intervals are chosen to be, the finer the grid is, and, accordingly, the more complex an evaluation becomes. The larger the time interval Δt is chosen to be, the coarser the grid is, whereby, even though the evaluation can be simplified, information which is relevant for finding the cause of the communications problems might possibly get lost. Optionally, the magnitude of the time intervals Δt should be varied at least once, in order to determine the ideal magnitude.

Figure 2:
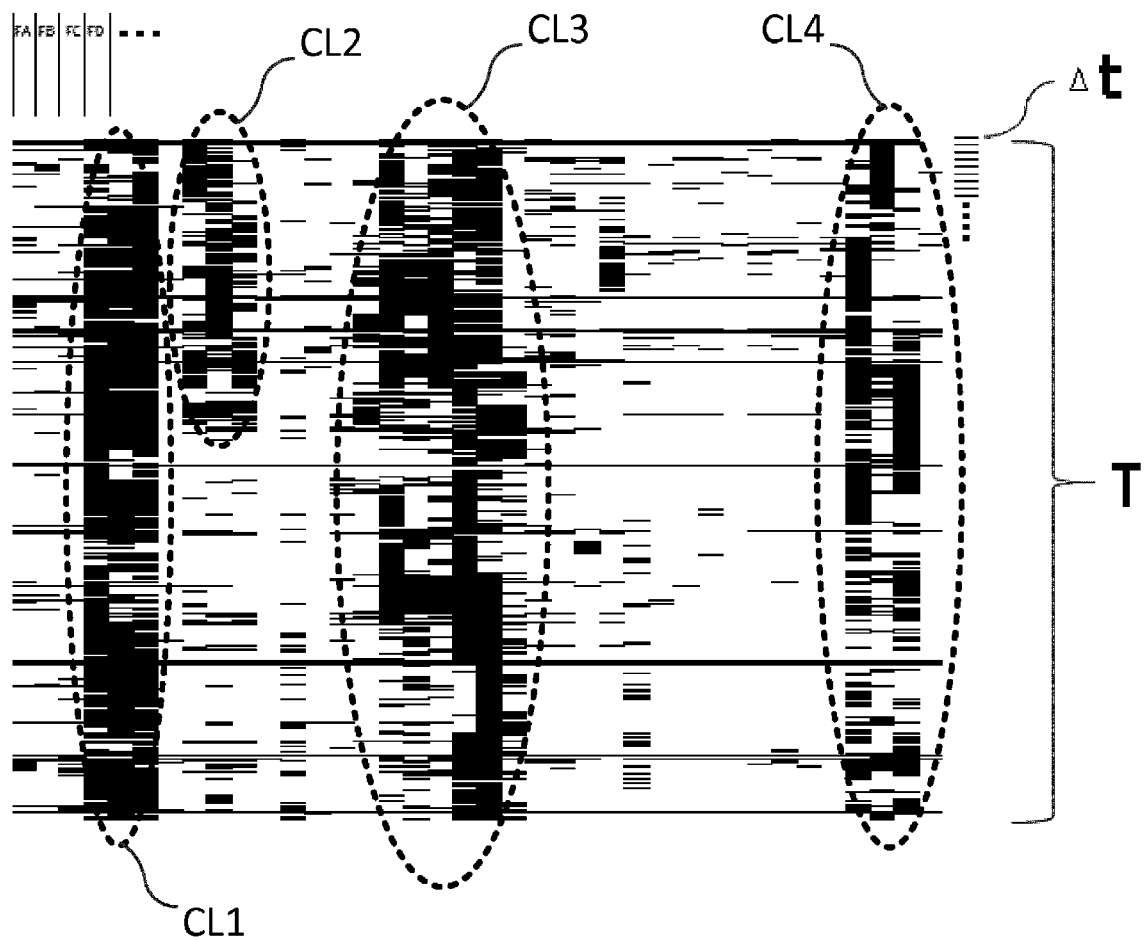
FIG. 2 shows a heat map according to an embodiment of the present disclosure.

In a simple heat map, such as that depicted in FIG. 2, this heat map can be evaluated by hand. Therefore, it is apparent that there are multiple abnormalities CL1, CL2, CL3, CL4. This involves a frequent occurrence of communications errors in certain field devices, wherein communications errors occur only sporadically in the remaining field devices. In this case, a trained service technician quickly recognizes that the cause of these specific communications errors is either in the ports of the communications unit PLC (e.g., corroded connection sockets) or in the cablings leading away from the communications unit PLC.

For more complex scenarios, the heat map can be analyzed electronically for abnormalities by means of cluster detection algorithms. As an alternative to the heat map, the representation can also be generated in tabular form and can be analyzed electronically.

It goes without saying that the exemplary embodiments shown are solely exemplary in nature, and the method according to the invention can be carried out with any type and arrangement of field devices FA, FB, FC, FD. Furthermore, any other filtering and evaluation mechanisms, as well as the evaluation of any further abnormalities CL1, CL2, CL3, CL4, can be used in conjunction with the method according to the invention.

LIST OF REFERENCE SYMBOLS

Δt Time interval
A Process automation system
D Data bus, communications network
DB Data bank
Diag1, Diag2, Diag3 Diagnostic notices
F Fieldbus, communications network
FA, FB, FC, FD Field device
CL1, CL2, CL3, CL4 Abnormalities (cluster)
PLC Communications unit, stored program control
T Total time period
WS1, WS2 Workstation PC

The invention claimed is:

1. A method for analyzing malfunctions and changes in device statuses in a system of automation technology, wherein the system includes a plurality of field devices, wherein the field devices communicate with one another directly via a communications network or via a communications unit, and the field devices are designed to issue an appropriate diagnostic notice depending upon a malfunction or a change in a device status in the system, and wherein the diagnostic notices are transmitted to a data bank and stored therein, the method comprising:
   reading the diagnostic notices from the data bank;
   filtering the read diagnostic notices according to a time period;
   filtering the read diagnostic notices using a selection criterion;
   linking the filtered diagnostic notices using time stamps, wherein a time stamp contains a date of occurrence of a malfunction contained in the corresponding diagnostic notice;
   dividing the time period into time intervals of equal time;
   grouping the linked diagnostic notices into the time intervals that correspond to their time stamps;
   creating a heat map from the grouped diagnostic notices, wherein along a first axis of the heat map is the plurality of field devices and along a second axis of the heat map are time intervals, whereby a grid is defined by the first and second axes, and
   wherein the creating of the heat map includes marking each occurrence of a diagnostic notice in the grid of the heat map at an intersection of a field device that issued the diagnostic notice and a time interval in which the diagnostic notice was issued; and
   evaluating the grouped diagnostic notices via evaluating the heat map with regard to defined abnormalities.

2. The method according to claim 1, further comprising:
   creating a proposal for correcting a cause of the malfunctions and the changes in the device statuses, wherein the proposal is based on the evaluation of the grouped diagnostic notices.

3. The method according to claim 1, wherein a computer unit evaluates the diagram using algorithms implemented on the computer unit, including algorithms for image or pattern recognition and algorithms for cluster detection.

4. The method according to claim 1, wherein the diagnostic notices are generated within a field device upon occurrence of at least one of the following malfunctions or changes in device statuses of the respective field device:
   a communications error of the respective field device;
   insufficient power supply or shutdown, or restart of the respective field device;
   a maintenance requirement of the respective field device;
   a measurement error generated by the respective field device;
   an error of at least one electronic component of the respective field device;
   an error of at least one software component of the respective field device;
   exceeding defined measuring ranges; and
   falling below the defined measuring ranges.

5. The method according to claim 1, wherein the read diagnostic notices are filtered based upon at least one of the following selection criteria:
   the device type of the field devices;
   the type of malfunction, or the change in the device status;
   the system sector in which the respective field devices are integrated;
   the respective communications unit with which the respective field devices communicate;

a respective communications structure of the field devices;
environmental influences which act on the corresponding field devices;
an operating period of the respective field devices;
an age of the field devices;
a serial number and a range of serial numbers;
a product batch of the field devices;
components of a supplier used for the system; and
the respective communications unit with which the respective field devices communicate.

6. The method according to claim 1, wherein the grouped diagnostic notices are evaluated with regard to at least one of the following abnormalities:
increasing occurrence of diagnostic notices of one or more of the field devices during one of the predetermined time intervals;
increasing occurrence of diagnostic notices with regard to a specific device type of the field devices;
increasing occurrence of diagnostic notices with regard to a respective communications structure of the field devices;
increasing occurrence of diagnostic notices with regard to a respective communications protocol of the field devices;
increasing occurrence of diagnostic notices with regard to process parameters of the field devices;
increasing occurrence of diagnostic notices with regard to a process medium with which the corresponding field devices come into contact;
increasing occurrence of diagnostic notices with regard to positions of the corresponding field devices in the system;
increasing occurrence of diagnostic notices with regard to environmental influences on the corresponding field devices;
increasing occurrence of diagnostic notices with regard to the age of the field devices;
increasing occurrence of diagnostic notices with regard to an installation height of the corresponding field devices;
increasing occurrence of diagnostic notices with regard to a type of installation of the corresponding field devices;
increasing occurrence of diagnostic notices with regard to a version number of firmware of the field devices;
increasing occurrence of diagnostic notices with regard to a version number of a communications protocol of the field devices;
increasing occurrence of diagnostic notices based upon material properties of the field devices;
increasing occurrence of diagnostic notices with regard to a power supply of the field devices; and
increasing occurrence of diagnostic notices with regard to maintenance and exchange plans of the field devices.

* * * * *